May 3, 1949.

R. E. GOULD 2,469,229

APPARATUS FOR PREPARING BUNGS OF CERAMIC WARE FOR FIRING

Filed Oct. 14, 1944

INVENTOR
Robert E. Gould.
BY
George J. Croninger
ATTORNEY

May 3, 1949.   R. E. GOULD   2,469,229
APPARATUS FOR PREPARING BUNGS
OF CERAMIC WARE FOR FIRING
Filed Oct. 14, 1944   3 Sheets-Sheet 2

INVENTOR
Robert E. Gould.
BY
George J. Crominger
ATTORNEY

May 3, 1949.

R. E. GOULD 2,469,229

APPARATUS FOR PREPARING BUNGS OF CERAMIC WARE FOR FIRING

Filed Oct. 14, 1944

INVENTOR
Robert E. Gould.
BY
George J. Croninger
ATTORNEY

Patented May 3, 1949

2,469,229

UNITED STATES PATENT OFFICE 2,469,229

APPARATUS FOR PREPARING BUNGS OF CERAMIC WARE FOR FIRING

Robert E. Gould, Hamburg, N. Y., assignor to Buffalo Pottery Incorporated, Buffalo, N. Y., a corporation of New York Application October 14, 1944, Serial No. 558,753

19 Claims. (Cl. 259—72)

This invention relates to a method of and apparatus for preparing bungs of ceramic ware for firing.

It has to do particularly with placing finely divided material between the individual pieces of a bung of unfired dinnerware, for instance plates, saucers, shallow bowls and the like, to support them and prevent them from warping or sticking together in the first fire.

Heretofore it has been the custom to work placing sand into the spaces between the individual pieces of ware comprising a bung, by vibrating the bung and a container filled with sand in which it is disposed with an up and down motion axially of the bung. The losses in the kiln from warping and sagging clearly indicate that bungs of ware prepared for firing in this fashion are not properly packed. If the bedding material is evenly and uniformly distributed throughout the bung and is solidly packed and of uniform density such losses will not occur as a general rule.

I have observed that vertical vibration causes the fines to separate from coarser aggregates and consequently the bung will be packed with different grades of bedding material at different levels. Thus the density of the pack is not the same throughout and warping is due to a large degree I believe to this condition. Furthermore, ordinary placing sand has a low angle of repose and falls out from between the pieces of ware at the perimeters thus allowing the unsupported brim to sag as the ware softens in the fire.

The object of this invention is to eliminate losses in the first fire due to warping and sagging from the causes specified and to provide new and improved methods and apparatus for accomplishing the desired result that are commercially practical.

Instead of employing ordinary placing sand which is a more or less gritty substance having only mediocre packing ability, I propose to employ material that is ground to a fine grained condition, somewhat on the order of a powdery dust. Such material has superior bedding ability because it will pack better and has a high angle of repose as the natural consequence of its finely divided physical state. I propose to surround the bung with an evenly distributed mass of the material and preferably while it is in what I shall call the "fluffy" state, that is to say before it has settled or become compacted, to work it evenly into the spaces between the ware. To do this, I prefer to employ a motion which will result in the occurrence of a difference in inertia as between the bung and the surrounding body of material such that the material will be caused to rapidly and evenly fill the spaces. I have found that a gyratory motion executed in a plane perpendicular to the vertical axis of the bung will give the desired results.

An advantageous feature of this invention is that it makes possible the firing of thin china or porcelain without prohibitive losses thereby effecting an economy in the cost of manufacture which may be responsible for placing such ware on a competitive basis with ordinary semi-vitreous ware.

Other objects and advantageous features will be noted in the accompanying description and drawings wherein similar characters of reference designate corresponding parts and wherein.

"Bedding material" or "bedding medium" as used herein means any material or mixtures of materials capable of use for the purpose specified and whose fusing point is above the temperature at which the ware is to be fired, and may include flint, zircon, kyanite, chert, fused alumina and various kaolins and is ground to such a degree of fineness that it is dustlike or powdery.

"Fluffy" or "fluffed" as used herein means the condition of the finely divided bedding material, when the same is of relatively low density or includes air adhering to the particles, and before the same settles or becomes compacted. "Fluffing" means the process of creating said condition.

Figures 1, 6:
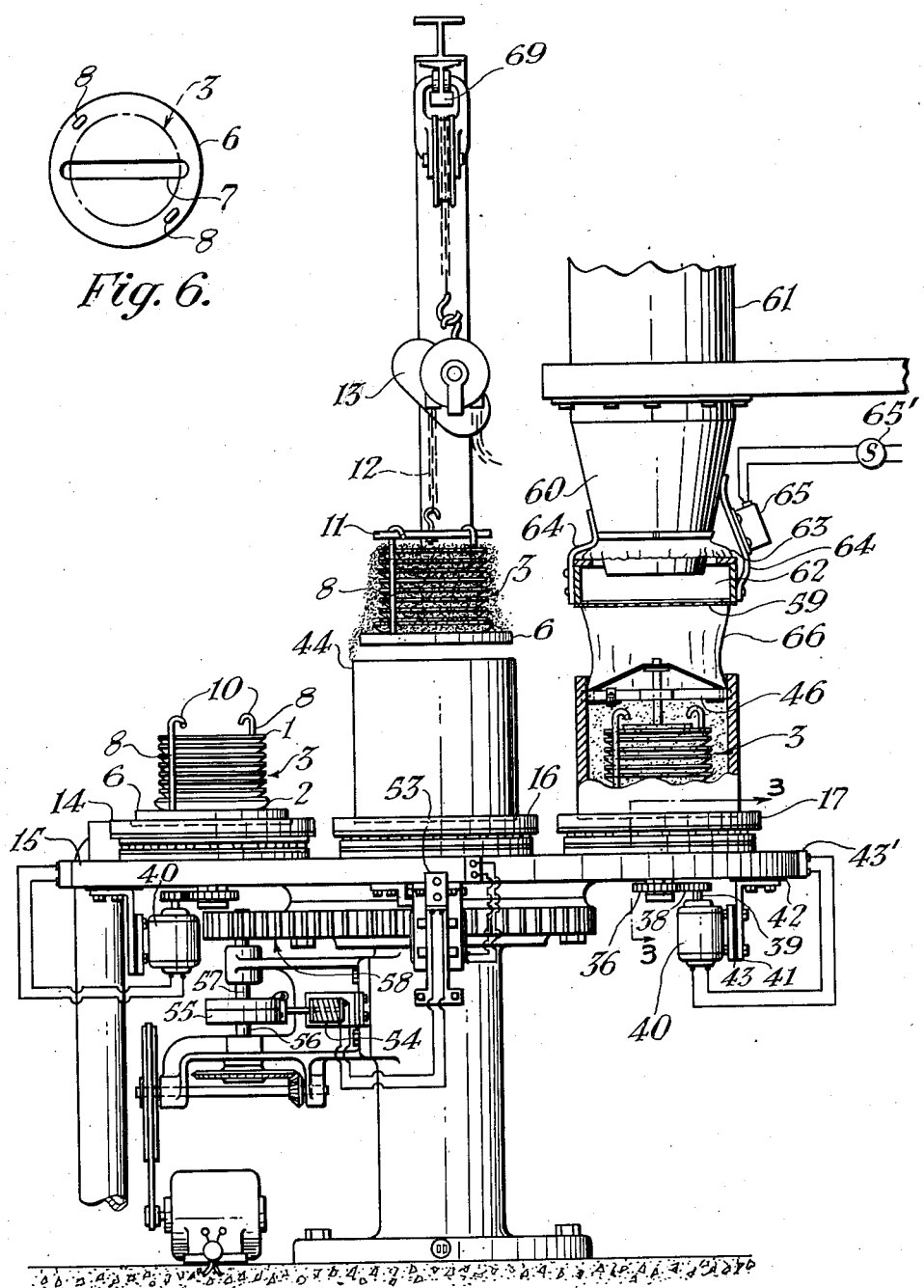
Figure 1, is an elevation, with some of the parts in section, of apparatus which may be used to perform the method hereof.
Figure 6, is a fragmentary sectional elevation of a bung of ware, inside a coddle and surrounded by placing material prior to the commencement of the placing operation.
Figures 4, 5, 10:
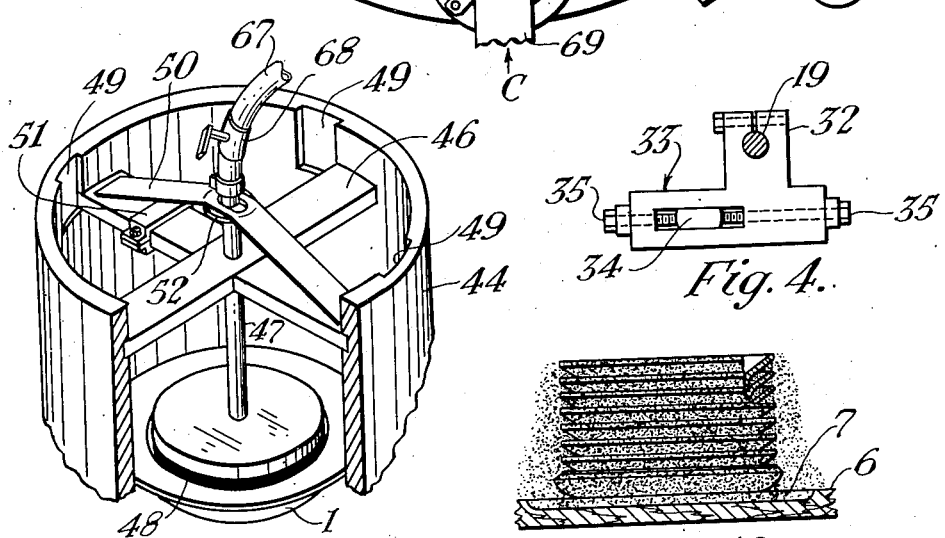
Figure 4, is a detail in plan on a reduced scale of the crank arm.
Figure 5, is a perspective view of a hold down device.

In practicing my method, several pieces 1, for instance vitreous dinnerware plates in the dried, unfired state, after being first inspected for cracks, are stacked up on a refractory setter 2, to form what is known in the art as a "bung" 3, Figures 1 and 10. The number of articles comprising any given bung may vary in accordance with the size and shape of the ware, however, for dinner plates the recommended number is eight or nine.

Figure 7:
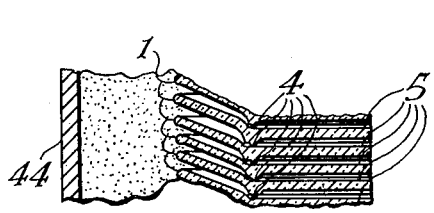
Figure 7, is a fragmentary sectional elevation of a bung of ware inside the coddle and surrounded by placing material at the completion of the placing operation.

The foot 4, Figure 7, of each piece of ware rests in the well 5 of the piece therebelow for the bottom-most piece which rests on the setter. After assembling the bung it is trued up so all the pieces are co-axial with each other and the setter. These operations may be performed by hand or machine.

There are fractional variations in the diameter of ware pieces of the same form, for instance a stack of dinnerware plates, and a variation up to $\frac{1}{32}''$ in diameter as between the pieces of ware in a bung is permissible. This is not however, to be considered as a limitation. It is merely preferred that the variation not exceed the amount specified.

The bung is placed in the exact center of a holder 6 of any suitable form or construction and shown herein as a wooden disc, Figures 1, 6 and 10, of larger diameter than the bung of ware. The bung can be evenly set in place and as evenly removed by diametrically notching out the top surface of the holder as at 7, to provide finger space below the resting place of the bung.

Figure 3:
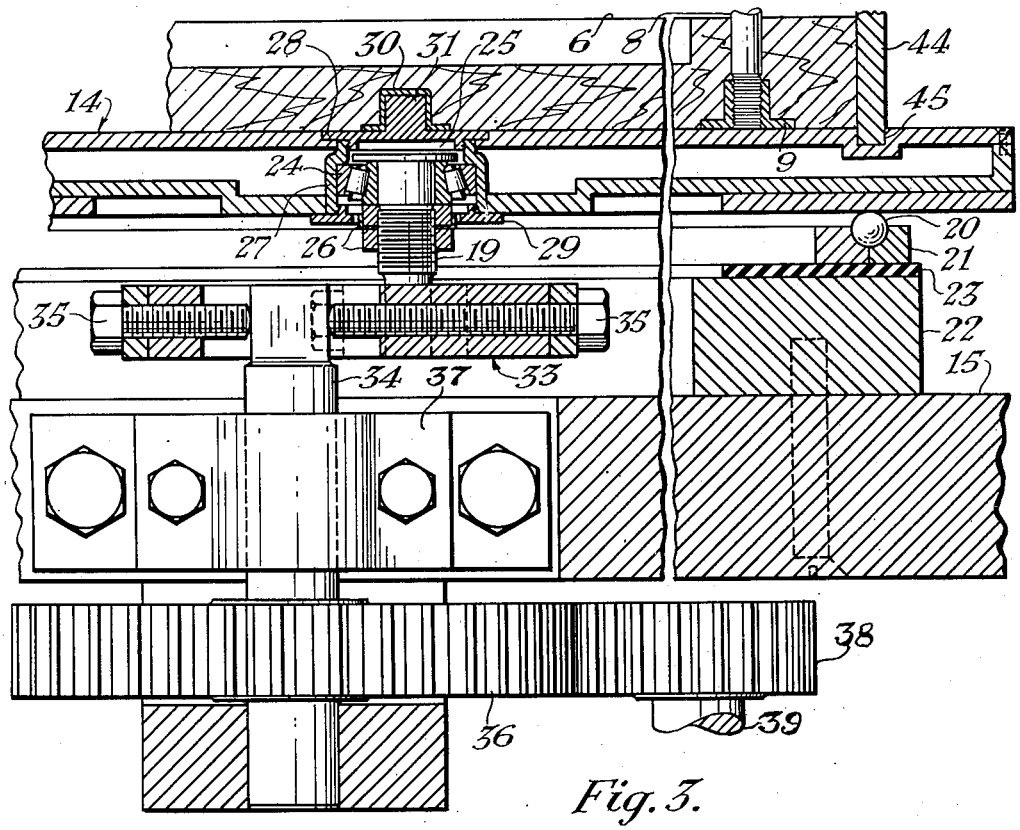
Figure 3, is a detail in section taken on the line 3—3 of Figure 1.

Means are provided for lifting holder 6 and carrying it from place to place in the form of diametrically opposed, upstanding rods 8 screwed into threaded ferrules 9 located, Fig. 3, inwardly from but near the perimeter of the holder. The upper extremities 10 of these rods, which project a short distance above the upper level of the bung, are hook shaped with the open sides turned in opposite directions to receive a lifting bar 11 balanced at the lower end of a hoist chain 12 attached to an overhead hoist 13 to be hereinafter referred to, Figure 1.

The bung may be assembled and placed in the holder at any desired location, for example, at a bench (not shown) convenient to or adjacent the discharge end, or alongside, an off bearing conveyor (not shown) for transporting ware from the finisher's bench, dryer or other points in the plant, to the bunging position.

The holder 6 with the bung of ware thereon is placed in the exact center of a movable support, for instance a coddle table 14, Figure 3, forming a part of the means for imparting to the bung a movement that will cause the bedding material to enter the spaces between the articles in the desired manner to be later described. Said coddle table and motion producing mechanism may be mounted on a stationary frame, for instance a bench to be located adjacent the bunging position or it may be mounted on a traveling carrier, for example an angularly movable table 15, Figures 1 and 2, along with other similar coddle tables 16, 17 and 18, to be carried from station to station thereby for purposes to be later described.

One form of motion which will produce the desired results is a gyratory movement. To this end, the coddle table is attached to a crank pin 19, co-axial with the center of the table, however, the weight of the table is supported on a ring of balls 20 disposed in race 21 mounted on a circular support 22 bolted to table 15. So that the gyrating coddle table will not shake table 15 and thereby interfere with operations at other stations, a pad of shock absorbent material 23 is placed beneath the race 21.

Sleeved on the crank pin 19 is an anti-friction thrust bearing 24 held against axial displacement thereon by head 25 and lock nuts 26 received on the threaded shank of the pin. The bearing is received in a hollow sleeve 27 inserted in the coddle table and held firmly in place by flanged upper and lower retainers 28 and 29 respectively screwed into the sleeve. The upper retainer 28 is formed as a cap to be screwed down flush with the top of the coddle table and act as a dust seal to protect the bearing 25. It is also formed with a center projection 30 on the axis of the crank pin which fits into a center hole 31 in the bottom of the holder 6 to prevent radial displacement of the holder.

It is preferred to employ a lightweight coddle table and if desired it may be of hollow construction as shown and made of aluminum or magnesium alloy or the like. Thus the tendencies of the table to get out of its given plane are minimized and wear and tear on the bearings and other operating parts greatly reduced.

The crank pin 19 is held in a split clamp 32 formed as a part of the crank 33 which is mounted on the upper end of a crank shaft 34 and rotates inside the circle of race support 22. The distance between centers of crank shaft 34 and crank pin 19 may vary within practical limits, however, I have found one half ($\frac{1}{2}''$) inch to be a satisfactory radius of gyration. Adjusting screws 35 are for varying the throw of the crank.

The crank shaft 34 may be driven in any suitable manner as by belt and pulley, friction drive or as shown herein by gear 36 fixed to the lower end thereof below oversized bearing 37 secured to the table 15 or other supporting structure if the coddle table is mounted on a stationary frame. Gear 36 is driven by pinion 38 on motor shaft 39. Motor 40 is carried by bracket 41 bolted to the table or other support, pads of shock absorbent material 42 and 43 being inserted between the bracket and table and bracket and motor respectively. The starting and stopping of the motor is controlled by a manual push button switch 43' placed in some location where it is conveniently accessible to the operator. The speed of rotation of the crank shaft should be approximately 240 R. P. M., however, this is not to be considered as a limitation because the shaft speed will be that which under practical operating conditions in any given instance will be found to produce the desired results.

After the holder 6, with the bung of ware thereon is placed on the coddle table, an open ended, tubular metal sleeve, 44, Figures 1, 3 and 5 sometimes called a "coddle," is placed around the bung and holder and, if desired, amy be seated in a circular groove 45 formed in the top of the coddle table surrounding the holder. The inside diameter of the sleeve and the outside diameter of the holder are preferably such as to provide a snug fit to prevent leakage of bedding material and tight enough to prevent the unseating of the coddle under the pressure necessary to hold the bung in place as hereinafter explained.

Since the overall height of a bung of ware may differ as between bungs of ware of different size and shape, the height or length of the coddle will be greater than the height of the bung, to provide space for the accommodation of means for holding the bung in place. Moreover, the bung of ware should be covered over with an ample supply of bedding material.

To prevent the bung from shifting from central position in the holder whilst the bung is being filled with bedding material, I propose to gently but firmly apply pressure thereto from above, axially of the bung. To this end, I prefer to employ a cross piece 46, Figure 5, preferably made of wood or light metal having a hole through the center in which a rod 47, co-axial with the holder 6, is slidably received. Attached to the lower end of the rod is a circular disc of yieldable or resilient material 48, made of soft rubber or the like which forms a pressure pad.

After the coddle is assembled, the cross piece is fitted into the bayonet slots 49 notched around the inner surface of the coddle at the top with the pressure pad, which is of sufficient diameter to fit at least the well, resting on the topmost piece of ware in the bung. A pressure applying member in the form of an elastic strap 50 anchored at one end to one of the arms of the cross piece and having the other end adjustably secured by means of a clamp 51 to the opposite arm is provided. This member has a center hole through which the rod 47 passes and it rests against a collar 52 fixed on the rod above the cross piece. The strap is adjusted for tension at the commencement of operations and the adjustment is not disturbed ordinarily until there is a change in production with a major difference in overall height of the bung. In other words, it is not absolutely necessary to unloosen the clamp each time a bung is changed. The rod can be pulled up by hand against the tension of the strap whilst the cross piece is being fitted in place or removed. An elastic member of this character is believed best suited for the purpose because it is self adjustable to fractional variations in overall height of successive bungs without increasing the pressure value to a point where it becomes detrimental.

The pressure applied is only sufficient to overcome centrifugal force and would be variable with the size of the ware and the strength of the clay. The maximum force should be applied over the area opposite the foot so that this pressure is carried from piece to piece down through the feet. The pressure pad, however, should be comparatively solid as the center position can carry part of the weight, and by reason of friction with the plate, help to keep the top piece from shifting.

It will be understood that other means for holding the bung in place may be substituted for that just described without departing from the spirit and scope of this invention. The object, of course, is to hold the component parts of the bung together in trued up, centered position on the holder during the operation of filling the bung with bedding material.

Figure 2:
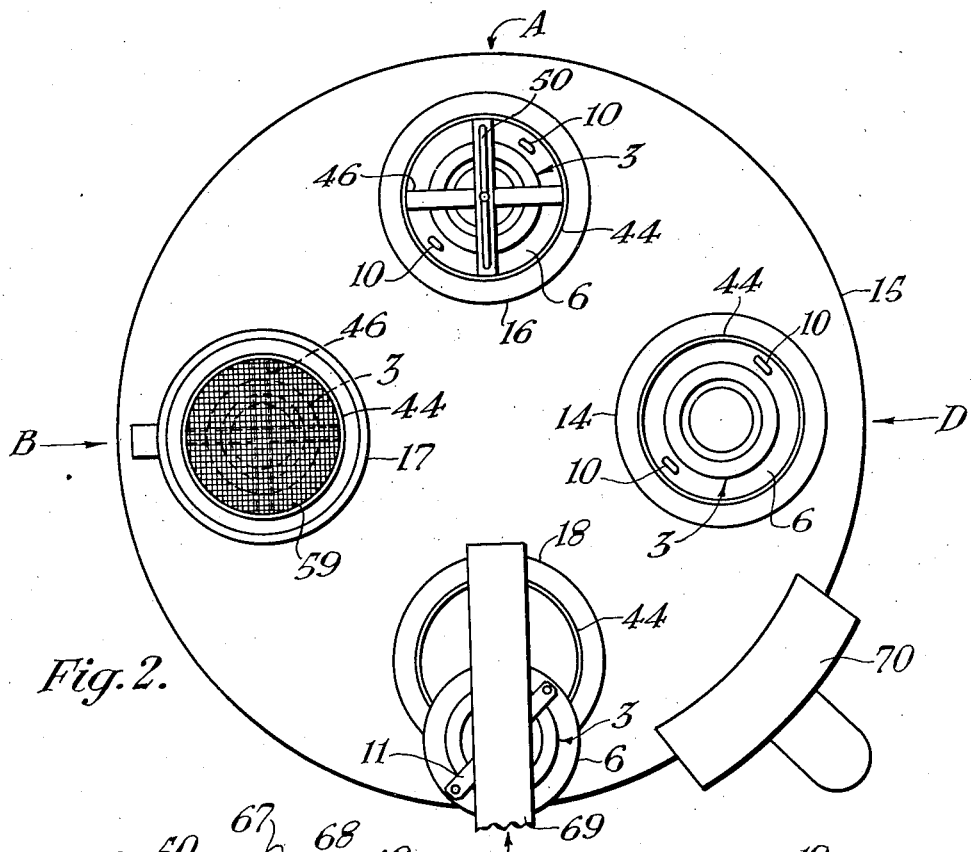
Figure 2, is a plan view of the apparatus of Figure 1.

If apparatus such as that disclosed in Figures 1 and 2 is being employed, the operation just described may be performed at station A, Figure 2.

The coddle is now ready to be filled with bedding material. If the operations are being performed at a stationary bench or table, a screen suspended from above is pushed over the coddle from which the supply of bedding material may be sifted thereinto. If the apparatus of Figures 1 and 2 is being employed, the table 15 is rotated one quarter turn to move an empty coddle from station A to station B.

A push button switch 53, conveniently located at bench height and connected in circuit with solenoid 54 controls the starting of the table. When the switch is actuated the solenoid throws in a single revolution clutch 55 between the continuously driven drive shaft 46 and the driven shaft 57 of 4 to 1 gear drive 58 associated with the table. After the table has made a quarter turn to accurately spot the coddle below the screen 59 at station B, it automatically stops as the clutch is thrown out.

The bedding material may comprise any desired material or mixtures of material as hereinbefore mentioned. The material is preferably ground to the fineness of a powdery dust, for instance, a grain size such that the particles will pass through a standard 60 mesh screen and be retained on a 250 mesh screen. The material should become "fluffy" when sifted and then settle a short time thereafter. If desired, material of larger grain size may be mixed therewith to expedite the flow of the mixture. For example about 20 per cent may be ground to a particle size which would be retained on a 140 mesh screen, however this is entirely optional. As before mentioned the angle of repose of material ground to the fineness specified herein is greater than that of ordinary placing sand, say somewhere in excess of 60 degrees.

It is desired to fill the coddle with bedding material quickly and with substantially even distribution. The screen 59 at station B is at least as large in diameter as the coddle and is suspended from the spout 60 of a pipe 61 leading down from an overhead supply bin (not shown) for the bedding material. The screen frame 62 surrounds the spout but does not touch it and flexible cloth boot 63 seals in the dust. The screen frame is suspended by flexible hanger brackets 64 one of which has an electrically operated vibrator 65 mounted thereon to vibrate the screen and cause the bedding material to be sifted into the coddle. The vibrator is controlled by a switch 65 located in such position as to be readily accessible to the operator. A flexible cloth boot 66, attached to the screen frame is fitted into the coddle before the sifting action is started to prevent the dust from escaping.

Finely ground material has the property of being fluffy for a short period, after which said material tends to compact. Shifting the material into the coddle renders the material fluffy. The time the material remains fluffy is thought to be about five seconds but may vary. The coddle table 14 should be set in motion before the material has compacted and while it is yet in a fluffy state, see Figure 7. Therefore as soon as the coddle is filled with bedding material, the operator stops the vibrator and interrupts the sifting operation and immediately starts motor 40. If the apparatus of Figures 1 and 2 is being employed, the operation of filling the bung is done at station B.

Figure 9:
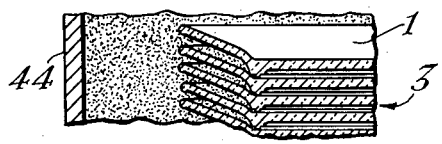
Figure 9, is an elevation of a bung of ware packed for firing in accordance with my invention with a portion thereof broken out and shown in section to illustrate the angle of repose of the placing material at the perimeter of the bung.
Figure 8:
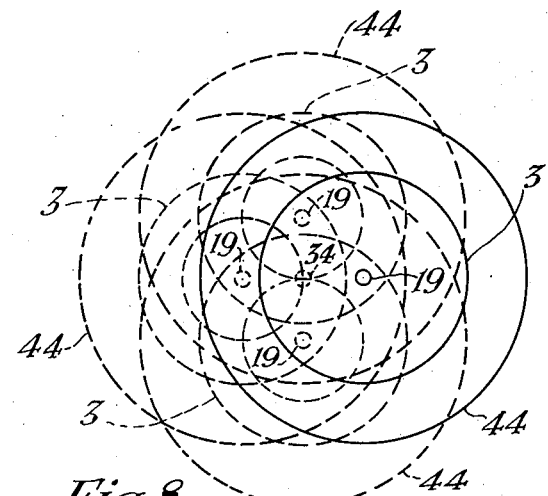
Figure 8, is a motion diagram illustrating the preferred movement of the bung and coddle incident to placing.

The gyratory action, see Figure 8, results in the bedding material entering the spaces between the ware pieces in uniform and even fashion throughout the several levels of the bung, see Figure 9. The bedding material settles and compacts after it enters the spaces and forms a pack or fill of uniform density throughout which extends to the outermost extremities of the ware brims, see Figure 10.

The filling action appears to be completed within five to ten seconds of the time the gyrating action commences. Gyrating for a longer period of time does not seem to be harmful, however, the action may be suspended after ten seconds if desired. The interval of gyration may be said to be optional as long as it is started whilst the material is in a fluffy state and is continued until all the space to be filled with bedding material has been occupied therewith. If desired, a timer may be employed in conjunction with switch 40 to stop the gyrating action automatically after a given interval of time has elapsed.

This invention also contemplates the step of agitating the bedding material in the coddle to maintain the material in a fluffy condition. This may be done by introducting compressed air through the holder 6 into the interior of the chamber from below. This action may be desirable where the interval between sifting and gyrating may exceed the normal interval which elapses before the bedding material compacts and would amount to prolonging the fluffy state by artificial means.

I am not entirely certain as to what causes the bedding material to enter the spaces in such uniform and even fashion. The bung of ware of course is held against axial displacement relative to the coddle whereas the bedding material is free to move within limits as the coddle gyrates and is subject to the action of centrifugal force. Just how these factors combine to induce the bedding material to enter the spaces in such a uniform and even fashion is not known for certain, however, the difference in inertia, as between the bung and the bedding during gyration is an important factor. There may be other explanations for the phenomena of which I am not aware and therefore, the foregoing explanation is not to be interpreted as a limitation.

After the filling action is completed, the bung is next removed from the coddle. If the operations are being performed at a single location, the screen and dust seal are removed to expose the contents of the coddle. If the machine of Figures 1 and 2 is being employed, the operation of removing the bung is performed at station C and the table is rotated one quarter of a turn from station B to bring the coddle into position below the hoist 13.

The pressure applying pad is first removed from the bung. Since considerable suction has been developed, due to the pressure, and the packed material surrounding said pad, it is preferably broken loose by air under pressure which may be accomplished by employing a hollow rod 41, Figure 5 and attaching an air hose 67 to the upper end thereof provided with a manual control valve 68. After the cross piece and pad have been taken out of the coddle, the coddle is lifted out of the groove and removed vertically, see Figure 10, without disturbing the material on the sides of the bung. This prevents any pressure, due to the residual material in the coddle from being applied to the material between the ware or causing it to pack tighter on one side than on the other to cause warping.

The bung of ware partly surrounded by the freed mass of bedding material is removed therefrom by fitting the lift bar 11 into hooks 19 and raising it with the hoist 13, Figure 1, on monorail 69 to be carried to a sagger filling position (not shown) and there disposed in a sagger preparatory to firing. It is not necessary to remove excess material from the top of the bung or that clinging to the sides.

The bedding material that remains after the bung has been broken out is reclaimed and reused. It may be removed from table 14 by centrifugal force and/or by suction. In the case of the machine of Figures 1 and 2, it is removed as the coddle table is rotated from station C to station D past suction nozzle 70. Any bedding material remaining on the tables is dusted off by hand at station D and the coddle groove cleaned. A fresh bung of ware is loaded on the coddle table at station D after the table is cleaned off and the coddle may also be set in place here or at station A, which ever is most convenient.

By employing a rotating table arrangement, the operations of preparing the bung for firing can be systematized and placed on a substantially continuous basis. An operator should be placed at each station for maximum production speed.

I claim:

1. The process of preparing bungs of ceramic ware for firing which comprises, fluffing a light, powdery, compactible bedding medium as the medium is placed around the bung and shaking some of the medium into the spaces between the articles.

2. The process of preparing bungs of ceramic ware for firing which comprises, placing a fluffed mass of light, powdery, compactible bedding material around a bung of ware and then by gyratory motion executed in a horizontal plane causing some of the material to enter the spaces between the articles before it compacts.

3. The process of preparing bungs of ceramic ware for firing which comprises, placing a fluffed mass of light, powdery, compactible bedding material around a bung of ware and shaking some of the material, before it compacts, with a back and forth motion executed in a plane normal to the axis of the bung to cause the material to enter the spaces between the articles.

4. The process of preparing bungs of ceramic ware for firing which comprises, sifting around the bung, a fluffy mass of bedding material confined to the immediate vicinity of the bung and then by a horizontal compacting motion extending over a period of from five to ten seconds, placing some of the material between the pieces of ware of the bung before the material compacts, removing the bung from the remainder of the bedding material and thereafter firing the bung.

5. A process of preparing bungs of ceramic ware for firing, which comprises confining about the bung a mass of finely divided bedding material which has a fusing point materially above the temperature at which the ware is to be fired and which, when packed has an angle of repose in excess of 60 degrees, and subjecting the bedding material while in fluffy condition to a horizontal compacting motion to pack some of the bedding material between the ware pieces comprising the bung.

6. A process of preparing bungs of ceramic ware for bisque firing which comprises placing a bung of ware inside a chamber open at the top, placing inside the chamber and around and above the bung a fluffy mass of a finely divided material having a fusing point materially above the firing temperature, and subjecting said chamber, material and bung to a horizontal, gyratory, compacting motion while the material is in a fluffy condition to cause some of the material to enter spaces between adjacent pieces of ware and to become uniformly packed in said spaces.

7. A process of preparing bungs of ceramic ware for bisque firing, which comprises, placing the bung inside a chamber open at the top, sifting a mass of bedding material to render it fluffy into said chamber from a position above the ware, and subjecting said material while in fluffy condition to a rapid shaking in a substantially horizontal direction to pack some of the material between the ware, said material when packed having an angle of repose of at least 60 degrees.

8. A process of preparing bungs of ceramic flatware for bisque firing, which comprises placing a bung of ware inside a chamber open at the top, applying downward pressure to the uppermost plate of the bung to hold the bung components from moving relatively to each other, placing inside the chamber around and above the bung a fluffy mass of finely divided refractory material and while the material is in a fluffy condition, subjecting said bung, said material and said container to a rapid shaking motion in a substantially horizontal direction to pack some of the material between the edge portions of said plates.

9. Apparatus for preparing bungs of ceramic ware for firing, including a support for the bung, a casing surrounding said bung, fluffing means arranged to fill the coddle with bedding material and means operable to impart a rapid shaking motion executed in a horizontal plane to the bedding material in the casing to pack some of the material between the ware pieces before said material compacts.

10. Apparatus for preparing bungs of ceramic ware for firing including a support for the bung, a casing surrounding the bung, fluffing means operable to fluff and discharge bedding material into said casing, and means operable to gyrate said casing in a substantially horizontal plane to pack some of said material between said articles.

11. Apparatus for preparing bungs of ceramic ware for firing comprising a support for receiving and supporting the bung, a casing for a quantity of bedding material, means for securing the bung against axial displacement relative to said support, means for sifting a quantity of bedding material into said casing and means for moving said casing in an endless path about a center point with sufficient rapidity to effect displacement of the bedding material and cause some of it to fill the spaces between the ware comprising the bung.

12. Apparatus for preparing bungs of ceramic ware for firing comprising a support for receiving and supporting the bung, a casing for a quantity of bedding material, a pressure pad for securing the bung against axial displacement relative to said support, means for sifting a quantity of bedding material to enter the spaces between the ware of the bung, means for breaking the vacuum between the pad and bung prior to removal of the pad from the bung and means for shaking the support and bung in a horizontal plane normal to the axis of the bung.

13. A process of preparing bungs of ceramic ware for firing which comprises, placing a bung of ware in a chamber, sifting a light, powdery, compactable bedding material into the chamber and around the bung of ware and shaking some of the material into the spaces between the articles comprising the bung of ware by a horizontal compacting motion normal to the vertical axis of the bung whereby the fluffiness imparted by sifting is removed from the bedding material in the spaces between articles to such an extent that the material in such spaces becomes a compact mass capable of supporting the bung components against sagging during firing.

14. A process of preparing bungs of ceramic ware for firing which comprises, placing a bung of ware in a chamber, sifting a light, powdery, compactable bedding material into the chamber around the bung of ware and before the material becomes compacted, shaking some of the material into the spaces between the articles comprising the bung of ware by a horizontal gyratory motion of the bung and chamber executed in a plane perpendicular to the vertical axis of the bung whereby the fluffiness imparted by sifting is removed from the bedding material in the spaces between articles to such an extent that the material in such spaces becomes a compact mass capable of supporting the bung components from the brim zone inwardly from sagging during firing.

15. A process of preparing bungs of ceramic ware for firing which comprises, confining about a bung of ware a light, powdery, compactible bedding material selected from a group consisting of flint, zircon, kyanite, chert, fused alumina and kaolin, fluffing the material as it is placed in confinement and before the material loses its fluffy character, shaking some of the material into the spaces between the articles comprising the bung of ware with a horizontal gyratory motion of the bung executed in a plane perpendicular to the vertical axis of the bung whereby the fluffiness of the material entering the spaces between articles is removed to such an extent that the material in such spaces becomes a compact mass of substantially uniform density throughout.

16. Apparatus for preparing bungs of ceramic ware for firing comprising, a support for receiving a bung of ware, an enclosure open at one end surrounding the bung, means for sifting a light, powdery, compactible bedding medium into said container to thereby fluff the medium, and means for imparting to said support, enclosure and bung, a horizontal, compacting motion to cause some of the bedding medium inside the enclosure to enter the spaces between the articles comprising the bung and to cause the material to lose its fluffy character and become compacted therein.

17. Apparatus for preparing bungs of ceramic ware for firing comprising, a support for receiving a bung of ware, an enclosure open at the top surrounding the bung, means for sifting a light, powdery, compactible bedding material into said enclosure, a power driven crank for imparting to said support, enclosure and bung, a gyratory motion in a horizontal plane perpendicular to the vertical axis of the bung and enclosure whereby to cause some of the material to enter the spaces between the articles comprising the bung and to cause the material to lose its fluffy character and become compacted therein.

18. Apparatus for preparing bungs of ceramic ware for firing comprising, a support for receiving a bung of ware, an enclosure open at the top surrounding the bung, means for sifting a light, powdery, compactible bedding material into said enclosure, and means for shaking some of the material inside the enclosure into the spaces between bung components and causing it to loose its fluffiness and become compacted therein including mechanism for gyrating the support, enclosure and bung in a horizontal plane perpendicular to the axis of the bung.

19. Apparatus for preparing bungs of ceramic ware for firing comprising, a rotatable table, a plurality of bung receivers carried thereby, means for rotating the table to carry the bung supports from station to station, means at one of said stations for sifting a light, powdery, compactible bedding material into said receivers, means for shaking some of the material inside the receivers into the spaces between bung components and causing it to loose its fluffy character and become compacted therein including means for imparting to each receiver a horizontal compacting motion executed in a horizontal plane perpendicular to the vertical axis of a bung and receiver and means at another of said stations for removing prepared bungs from the table and carrying them away.

ROBERT E. GOULD.

REFERENCES CITED

The following references are of record in the file of this patent:

UNITED STATES PATENTS

| Number    | Name      | Date          |
|-----------|-----------|---------------|
| 918,388   | Stubbs    | Apr. 13, 1909 |
| 1,923,678 | Lowell    | Aug. 22, 1933 |
| 2,119,174 | Nicolas   | May 31, 1938  |
| 2,134,361 | French    | Oct. 25, 1938 |
| 2,145,198 | Kiesskalt | Jan. 24, 1939 |
| 2,347,940 | Emerson   | May 2, 1944   |
| 2,359,879 | Schweitzer | Oct. 10, 1944 |